(12) United States Patent
Pournasseh et al.

(10) Patent No.: US 7,283,950 B2
(45) Date of Patent: Oct. 16, 2007

(54) SYSTEM AND METHOD FOR TRANSLATING FROM A SOURCE LANGUAGE TO AT LEAST ONE TARGET LANGUAGE UTILIZING A COMMUNITY OF CONTRIBUTORS

(75) Inventors: Houman Pournasseh, Bellevue, WA (US); Lori Ann Brownell, Fall City, WA (US); Terri Lee Duffy, Soap Lake, WA (US)

(73) Assignee: Microsoft Corporation, Redmond, WA (US)

( * ) Notice: Subject to any disclaimer, the term of this patent is extended or adjusted under 35 U.S.C. 154(b) by 833 days.

(21) Appl. No.: 10/679,795

(22) Filed: Oct. 6, 2003

(65) Prior Publication Data

US 2005/0075858 A1 Apr. 7, 2005

(51) Int. Cl.
*G10L 15/00* (2006.01)
(52) U.S. Cl. .............................. 704/8; 704/4
(58) Field of Classification Search .............. 704/4, 704/8
See application file for complete search history.

(56) References Cited

U.S. PATENT DOCUMENTS

| | | | | |
|---|---|---|---|---|
| 5,303,151 A | * | 4/1994 | Neumann | 704/2 |
| 6,002,997 A | * | 12/1999 | Tou | 704/2 |
| 2003/0101044 A1 | * | 5/2003 | Krasnov | 704/4 |
| 2003/0135501 A1 | | 7/2003 | Frerebeau et al. | |

OTHER PUBLICATIONS

Collins, R.W., "Software Localization for Internet Software: Issues and Methods," *IEEE Software*, Mar./Apr. 2002, pp. 74-80.

"Google in Your Language," © 2000 Google, <http://services.google.com/tcbin/tc.py . . .> [retrieved Jul. 21, 2003], 12 pages.

"Software and Web Localisation," 101Translations.com, © 2002 Averbage Ltd., <http://www.101translations.com/software.shtml> [retrieved Jul. 18, 2003], 2 pages.

Tacão, E., "Update on Localisation Style Guides and Glossaries," Dec. 8, 2000, <http://mail.gnome.org/archives/gnome-i18n/2000-December/msg00040.html> [retrieved Jul. 18, 2003], 2 pages.

Tworney, M., "Update on Localisation Style Guides and Glossaries," Dec. 5, 2000, <http://mail.gnome.org/archives/gnome-i18n/2000-December/msg00011.html> [retrieved Jul. 18, 2003], 2 pages.

Wigestrand, H., "Innovative and Interactive Internationalization of Software and Documentation," *A Contemporary Renaissance: Changing the Way We Communicate, Proceedings of the 1998 IEEE International Professional Communication Conference*, Quebec City, Canada, Sep. 23-25, 1998, pp. 141-144.

\* cited by examiner

*Primary Examiner*—Daniel Abebe
(74) *Attorney, Agent, or Firm*—Christensen O'Connor Johnson Kindness PLLC

(57) ABSTRACT

A method and system are provided for translating terms from a source language to a target language utilizing a community of contributors. The source language terms are stored in an active glossary (400), the translation of which may be governed by an administrator. A community of contributors suggests translations for terms in the active glossary (400). A moderator selected by the administrator moderates translation of the terms in the active glossary (400) into the target language. Accordingly, the moderator may, in the exercise of his or her judgment, lock a particular suggested translation, making it the final translation for a term in the source language. Upon satisfaction of some predetermine exit criteria, e.g., a time deadline or completion threshold, the active glossary (400) is locked and all of the final translations for terms in the source glossary selected by the moderator are then stored in a localized glossary (500).

36 Claims, 11 Drawing Sheets

SYSTEM AND METHOD FOR TRANSLATING FROM A SOURCE LANGUAGE TO AT LEAST ONE TARGET LANGUAGE UTILIZING A COMMUNITY OF CONTRIBUTORS

FIELD OF THE INVENTION

The invention relates to a system and method for translating a glossary of terms from a source language to a target language by utilizing a community of contributors. More particularly, the invention relates to selecting a single translation for each term in the glossary from a plurality of suggested translations for the term submitted by contributors through a Web site and using the selected translation as the final translation for that specific term.

BACKGROUND OF THE INVENTION

With the increasing globalization of the economy, opportunities exist for many companies to derive significant revenues outside of their local geographic area. However, to realize these revenues, the products and services offered by a company typically need to be localized to conform to the customs and culture of the geographic areas where the company wishes to do business. A significant aspect of localization involves the process of translating terms and phrases associated with a product or service into the geographic area's native language. However, for some native languages, English is still the predominant language when it comes to computing, and thus English terminologies are often borrowed for use in these native languages. Because many software products commonly use computer-specific terminologies in their user interface, the task of properly translating software into these native languages is difficult (e.g., since some words should not be translated).

Translation has traditionally been performed using humans, automated methods, or both. Using humans typically means hiring a translator or group of translators to translate a set of terms. Automatic methods typically involve translation software, but human intervention is still needed to handle technical terms with no corresponding foreign-language equivalent and to deal with differences in meaning from direct translations due to cultural differences. Additionally, the translation software will likely not be able to translate terms that have been specifically created for a new product.

Organizations may choose to conduct localization using in-house resources or outsource the bulk of the localization effort. Companies that attempt localization using in-house resources usually experience significant costs and may lack the required expertise. Outsourcing localization may be cheaper (albeit still costly), but means that the organization must depend on the company providing the localization services. Additionally, outsourcing means the organization is dependent on the localization experience and linguistic skills of the hired localization experts. These few localization experts would be responsible for the entire localization effort. If a single translator were used, the organization would be highly dependent on that person's skill and availability.

Accordingly, the prior art is lacking an effective method and system for translating terms from a source language to a target language.

SUMMARY OF THE INVENTION

A system is provided for translating source language terms into target language terms. The system comprises a database that stores a first glossary for source language terms and a second glossary for target language terms; and a server that: collects suggested translations for source language terms stored in the first glossary, obtains a final translation for individual source language terms stored in the first glossary, and stores the selected final translations for individual source language terms in the second glossary. The system may also comprise a client computing device that displays a user interface through which users may submit suggested translations for source language terms and/or select a final translation for individual source language terms.

In accordance with other aspects of the present invention, the final translations of individual source language terms are stored in the second glossary when a predetermined criteria has been satisfied. For example, final translations of individual source language terms are stored in the second glossary when a deadline has been satisfied, when final translations have been selected for a predetermined percentage of source language terms, when suggested translations have been collected for a predetermined percentage of source language terms, or when both a deadline has been satisfied and when final translations have been selected for a predetermined percentage of source language terms.

In accordance with yet other aspects of the present invention, a method and a computer-readable medium having computer executable components are also provided for translating terms in a source language into terms in a target language.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The following discussion is intended to provide a brief general description of a computing system suitable for implementing various features of the invention. While the computing system will be described in the general context of a personal computer usable in a distributed computing environment, where complementary tasks are performed by remote computing devices linked together through a communication network, those skilled in the art will appreciate that the invention may be practiced with many other computer system configurations, including multi-processor systems, mini-computers, mainframe computers, and the like. In addition to the more conventional computer systems described above, those skilled in the art will recognize that various components of the invention may be practiced on other computing devices including laptop computers, tablet computers, personal digital assistants (PDAs), and other devices which computer software or other digital content is installed.

While aspects of the invention may be described in terms of programs executed by a Web browser in conjunction with a personal computer, those skilled in the art will recognize that those aspects also may be implemented in combination with other program modules. Generally, program modules include routines, programs, components, data structures, etc. that perform particular tasks or implement particular abstract data types.

Figure 1:
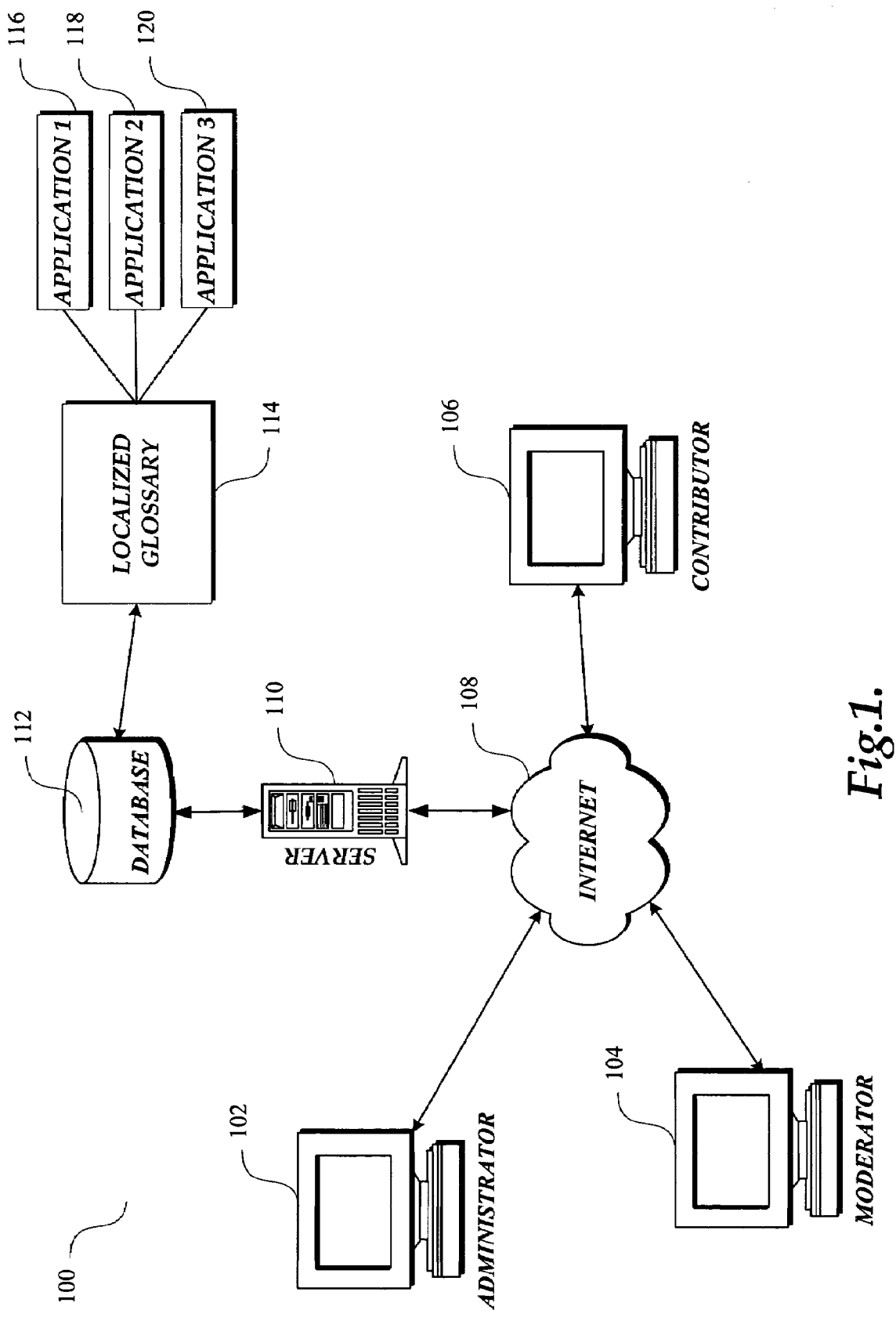
FIG. 1 is a pictorial diagram of a Web-based translation system formed in accordance with the present invention.

FIG. 1 depicts an exemplary system 100 used in translating terms from a source language to a target language in accordance with the present invention. The system 100 comprises a server 110 communicatively coupled to a database 112 or other data source (e.g., device, program, database, etc.) capable of collecting and storing translated terms and communicating the same to the server 110. The database 112 may be a local database or file, such as one stored in memory of the server 110, or a remote database located on another computing device accessible to the server 110 directly or via a network, such as the Internet 108. During downloads of requested data, the server 110 transfers data from the database 112 via the Internet 108, sends it to one or more client computers 102, 104 or 106, which, in turn, displays the data to a user.

The database 112 stores one or more active and localized glossaries. For purposes of the present description, a "glossary" may include terms with a corresponding definition or without a corresponding definition. An active glossary 400 is a glossary of terms requiring translation from a source language into a target foreign language. In one embodiment of the present invention, the source language is English. However, those skilled in the art will appreciate that the source language may be any written language. Similarly, the target language may be any written language as well. Further, in one embodiment of the present invention, the active glossary 400 may comprise a glossary of source language terms used in a particular product, e.g., Microsoft's WINDOWS® operating system. The translation system of the present invention could then be used to translate or "localize" the WINDOWS software glossary into various target languages. A resultant localized glossary 500 including the finalized target language terms can then be exported for use by other parties and used for reference. Those skilled in the art will recognize, however, that the active glossary 400 and localized glossary 500 may alternatively be used to translate any collection of source language terms, e.g., a dictionary or other reference, a book, a document, a Web page, etc., for either commercial or non-commercial purposes. For example, in the illustrated embodiment, the active glossary 400 and resultant localized glossary 500 are used to internationalize a software program. However, in another application, the active glossary 400 and localized glossary 500 may be used to internationalize a dictionary. It will be appreciated by those skilled in the art that the present invention may be used to internationalize any collection of source language terms that interfaces with others through written words. For purposes of the present description, any such collection of source language terms shall be referred to as a product.

FIG. 1 depicts a single active glossary 400 and a single localized glossary 500. However, it will be appreciated that the database 112 may include one or more active and/or localized glossaries. Each active glossary and corresponding localized glossary or glossaries may correspond to a different product. Additionally, the localized glossaries will generally correspond to various target languages. However, there may be several localized glossaries in the same target language, each glossary corresponding to a different product. Additionally, there may be several localized glossaries corresponding to the same product with each glossary in a different target language.

As shown in FIG. 1, the server 110 is communicatively coupled to the database 112. The server 110 is also communicatively coupled to various client computers through a communication network, such as the Internet 108. Additionally, the server 110 is operable to send translation data and instructions to and from various client computers operated by a user of the present invention. In one embodiment, users may be given one of the following three access levels: administrator, moderator, or contributor. As will be described in more detail below, a contributor is a user authorized to browse an active glossary and submit suggested translations for terms in a source language; a moderator is a user authorized to moderate contributor suggestions and, in the exercise of his or her judgment, select or "lock" one or more of the suggested translations as the final, localized term in a target language; and an administrator is a user authorized to set exit criteria for locking an entire active glossary 400 and making it a localized glossary 500.

Returning to FIG. 1, separate client computers 102, 104 and 106 are depicted for use by an administrator, a moderator, and a contributor, respectively. Each client computer generates a user interface, e.g., a Web page, that allows administrators, moderators and contributors to add suggested translations, lock translations, and set exit criteria in accordance with the user's particular access level, as briefly described above. However, it will be appreciated by those skilled in the art that an administrator, a moderator, or a contributor may log onto the system through any connected client computer. Additionally, it will be appreciated by those skilled in the art that any number of client computers may interact with the system at one time. There may be three administrator clients 102 logged on at any one time and no moderator or contributor client computers logged on, while at another time there may be two contributor clients 106 and two moderators logged on with no administrators. It will be appreciated by those skilled in the art that the number of client computers that can be logged on at one time does not limit the invention. The system is operable with no client computers logged on or several.

Figure 2:
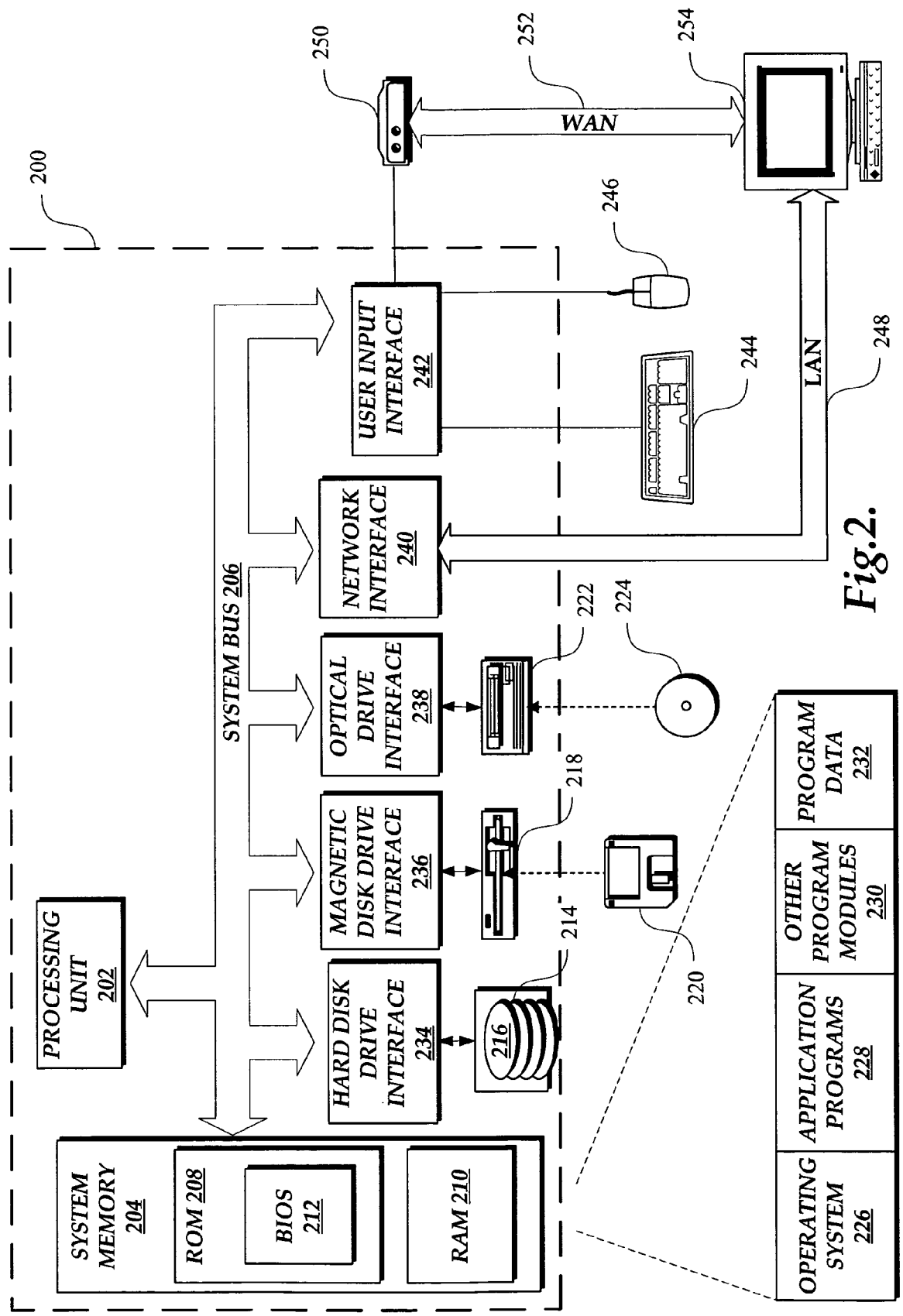
FIG. 2 is a pictorial diagram of a server computer used to translate terms found in an active glossary (i.e., a glossary of terms in a source language currently being translated) in accordance with the present invention.

The various components of server computer 110 for generating and downloading Web pages for display by the client computers in accordance with the present invention are shown in more detail in FIG. 2. Those skilled in the art will appreciate that the server computer 110 includes many more components than those shown in FIG. 2. However, it is not necessary that all of these generally conventional components be shown in order to disclose an enabling embodiment for practicing the present invention. The server 110 includes a processing unit 202, a system memory 204, and a system bus 206 that couples the system memory to the processing unit 202. The system memory 204 includes read-only memory (ROM) 208 and random-access memory (RAM) 210. A basic input/output system 212 (BIOS), containing the basic routines that help to transfer information between elements within the server computer 200, such as during startup, is stored in ROM 208. The client 110 further includes a hard disk drive 214, a magnetic disk drive 218, e.g., to read from or write to a removable disk 220, and an optical disk drive 222, e.g., for reading a CD-ROM disk 224 or to read from or write to other optical media. The hard disk drive 214, magnetic disk drive 218, and optical disk drive 222 are connected to the system bus 206 by a hard disk drive interface 234, a magnetic disk drive interface 236, and an optical drive interface 238, respectively. The drives and their associated computer-readable media provide nonvolatile storage for the server 110. Although the description of computer-readable media above refers to a hard disk 216, a removable magnetic disk 220, and a CD-ROM disk 224, it should be appreciated by those skilled in the art that other types of media that are readable by a computer, such as magnetic cassettes, flash memory cards, digital video disks, Bernoulli cartridges, ZIP disks, and the like may also be used in the exemplary operating environment.

A number of program modules may be stored in the drives and RAM 210, including an operating system 226, one or more application programs 228, other program modules 230 for implementing the translation functions of the present invention, and program data 232. A user may enter commands and information into the server 110 through input devices such as a keyboard 244, a mouse 246, or the like. These and other input devices are often connected to the processing unit 202 through a user input interface 242 that is coupled to the system bus, but may be connected by other interfaces (not shown), such as a game port or a universal serial bus (USB). A display device 258 is also optionally connected to the system bus 206 via a display subsystem that typically includes a graphics display interface 256 and a code module, sometimes referred to as a display driver, to interface with the graphics display interface. The display device could be integrated into the housing of the server 110. Furthermore, in other computing systems suitable for implementing the invention, the display could be overlaid with a touch-screen. In addition to the elements illustrated in FIG. 2, a server may also include other peripheral output devices (not shown), such as speakers or printers.

The server 110 may operate in a networked environment using logical connections to one or more remote computers, such as a remote computer 254. The remote computer 254 may be a server, a router, a peer device, or other common network node, and typically includes many or all of the elements described relative to the server 110. The logical connections depicted in FIG. 2 include a local area network (LAN) 248 and a wide area network (WAN) 252. The LAN 248 and WAN 252 may be wired, wireless or a combination thereof. Such networking environments are commonplace in offices, enterprise-wide computer networks, intranets, and the Internet.

When used in a LAN networking environment, the server 110 is connected to the LAN 248 through a network interface 240. When used in a WAN networking environment, the server 110 typically includes a modem 250 or other means for establishing communications over the WAN 252, such as the Internet. The modem 250, which may be internal or external, is connected to the system bus 206 via the user input interface 242. In a networked environment, program modules depicted relative to the server computer 110, or portions thereof, may be stored in the remote memory storage device. It will be appreciated that the network connections shown are exemplary and other means of establishing a communication link between the computers may be used. In addition, the LAN 248 and WAN 252 may be used as a source of nonvolatile storage for the system.

Figure 3:
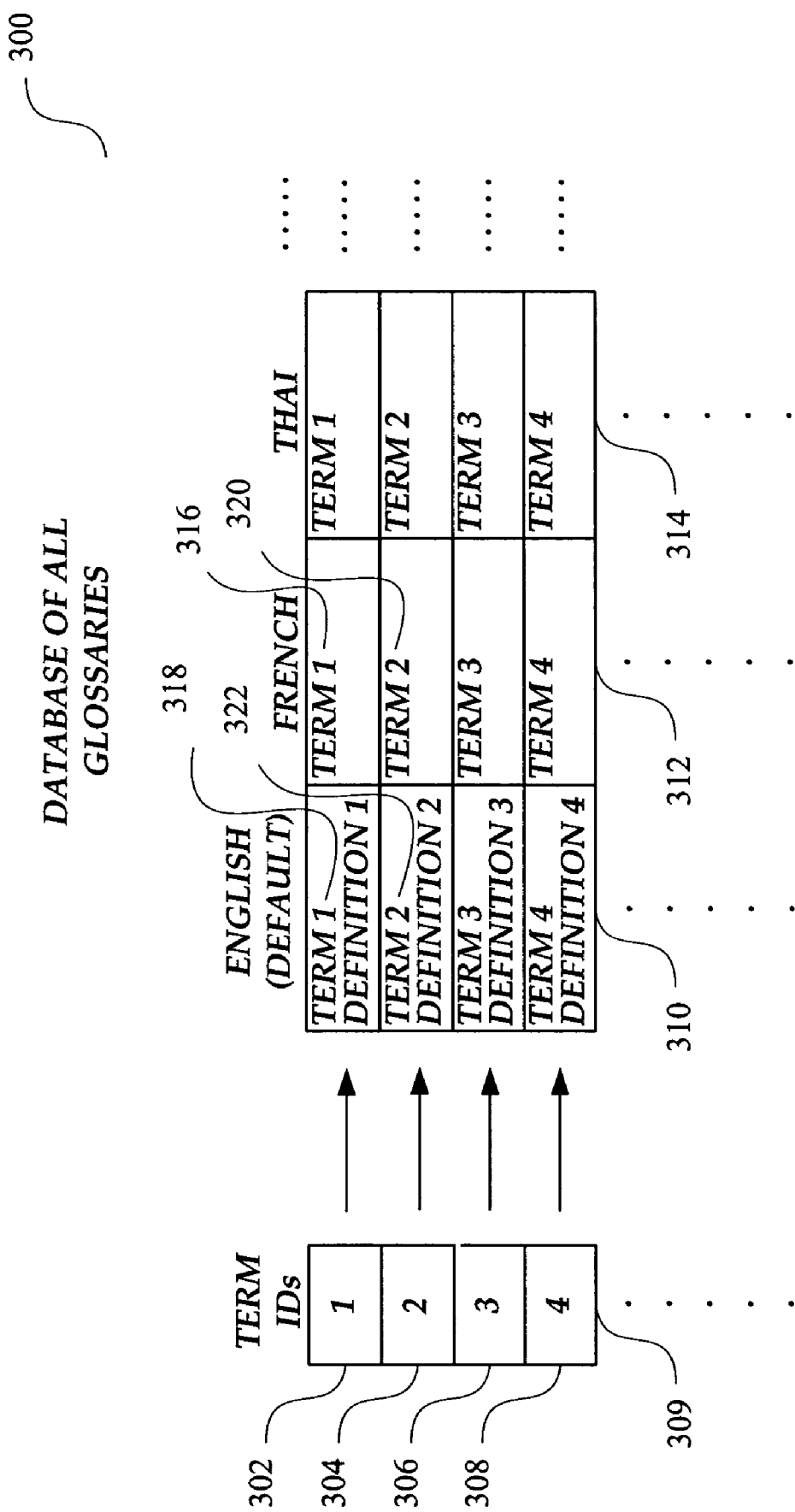
FIG. 3 is a block diagram illustrating a database of localized glossaries (i.e., a localized glossary is a glossary of terms in a target language that have been translated from a source language) in accordance with the present invention.
Figure 4:
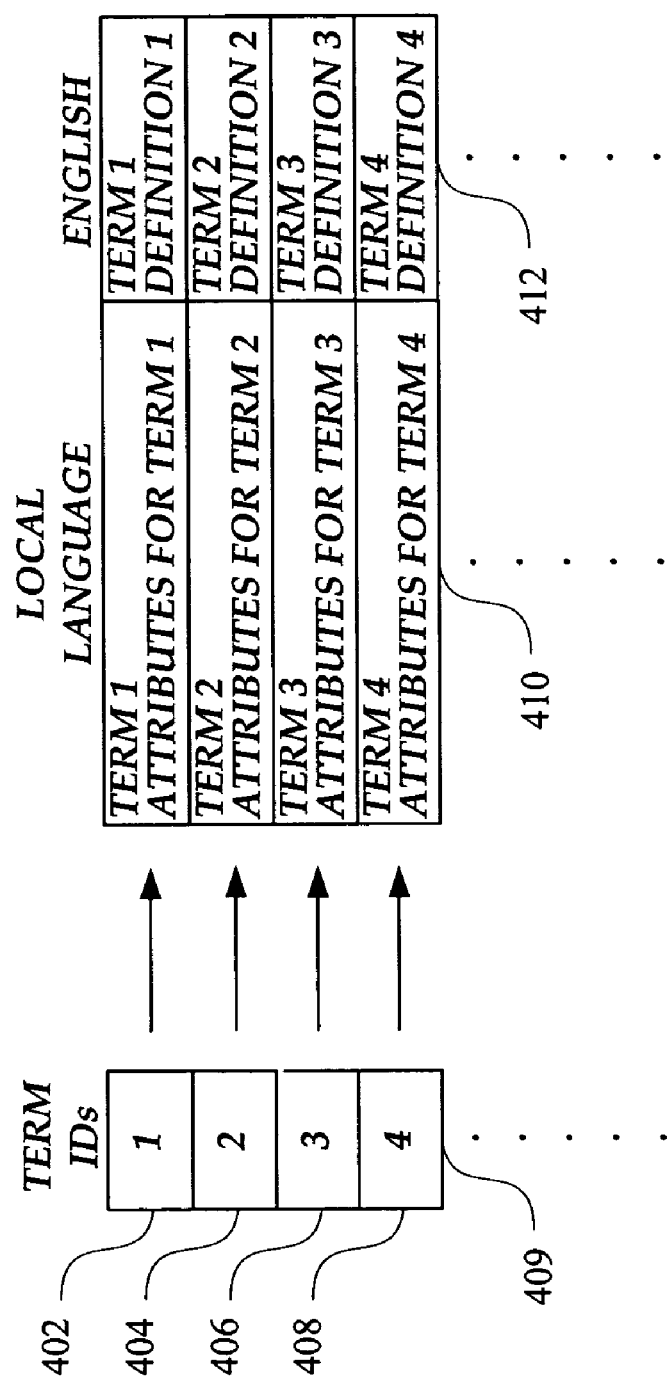
FIG. 4 is a block diagram illustrating an active glossary.

FIG. 3 is a depiction of the data structures stored in the database 112 of FIG. 1 and accessed by the server 110 in accordance with the present invention. As shown in FIG. 3, the database 112 may include several localized glossaries 500. In one embodiment of the present invention, the database 112 includes a source glossary 310 composed of terms in a source language, e.g., English, as well as a definition for each term. However, terms may also stand alone without a corresponding definition or explanation. The database 112 may also include several previously localized glossaries 500a and 500b in various target languages, such as French, Thai, etc. Each term in a localized glossary corresponds to a term in the source glossary 310. For example, in the illustrated embodiment, term 1 316 from French localized glossary 500a corresponds to term 1 318 in the English source glossary 310. Likewise, term 2 320 in the French localized glossary 500a corresponds to term 2 322 in the English source glossary 310. Further, each term in the source glossary 310 may have a corresponding term ID 309. For example, term 1 318 has a corresponding term ID 302, term 2 322 corresponding term ID 302, and so on. As will be described in more detail below, each term ID is used as an index into the source glossary 310, and thus, any corresponding localized glossary 500, e.g., French glossary 500a, Thai glossary 500b, etc. The term ID may be a number or any unique mark without departing from the scope of the claims that follow.

It will be appreciated by those skilled in the art that a glossary can have any number of terms. Furthermore, in some embodiments of the present invention, a term in the source glossary 310 may correspond to more than one term in a localized glossary 500. In other words, alternative translations may be provided in the localized glossary 500. Additionally, it will be appreciated that the database 112 is operable to store any number of glossaries. For example, there may be several source glossaries, each source glossary corresponding to a different product or a different source language. Similarly, each localized glossary 500a, 500b, etc. may correspond to one or more source glossaries 310.

Now that the contents of database 112 have been described, an active glossary 400 will be described in more detail. An active glossary is one for which users are currently contributing suggested translations in a target language. In the illustrated embodiment, the active glossary 400 comprises the source glossary 310 and a target language glossary 412. Additionally, each term in the source glossary 310 and corresponding target language glossary 412 is indexed by a corresponding term ID 309. Accordingly, a corresponding pair of terms in the source glossary 310 and target language glossary 412 is identified by a corresponding term ID 309. For example, term 1 in the source and target language glossaries is indexed by term ID 1 302, term 2 is indexed by term ID 2 304, etc.

As will be described in more detail below, the server 110 distributes the active glossary 400 to a community of registered contributors so that the contributors may submit suggested translations in the target language for the terms contained in the source glossary 310. In one embodiment of the present invention, the suggested translation may be a word. It will be appreciated by those skilled in the art that a suggested translation may take many forms, e.g., a phrase, sentence, number, plurality of sentences, etc. The suggested translations for a term are stored in the target language glossary 412 of the active glossary 400, along with any additional comments, a user identifier, a time stamp indicating a date and/or time the suggested translation was submitted, and a status flag indicating whether a translation for the term has been locked. Together, the aforementioned translation data is referred to as a "glossary contribution." In alternative embodiments of the invention, a glossary contribution may be comprised of more or less data than previously described. Accordingly, as contributors submit suggested translations for a term in the source language glossary 310, the resulting translation data, i.e., "glossary contributions" are stored in the database 112 in the corresponding target language glossary 412 using the appropriate term ID 309 for the source term as an index into the active glossary 400.

Figure 5:
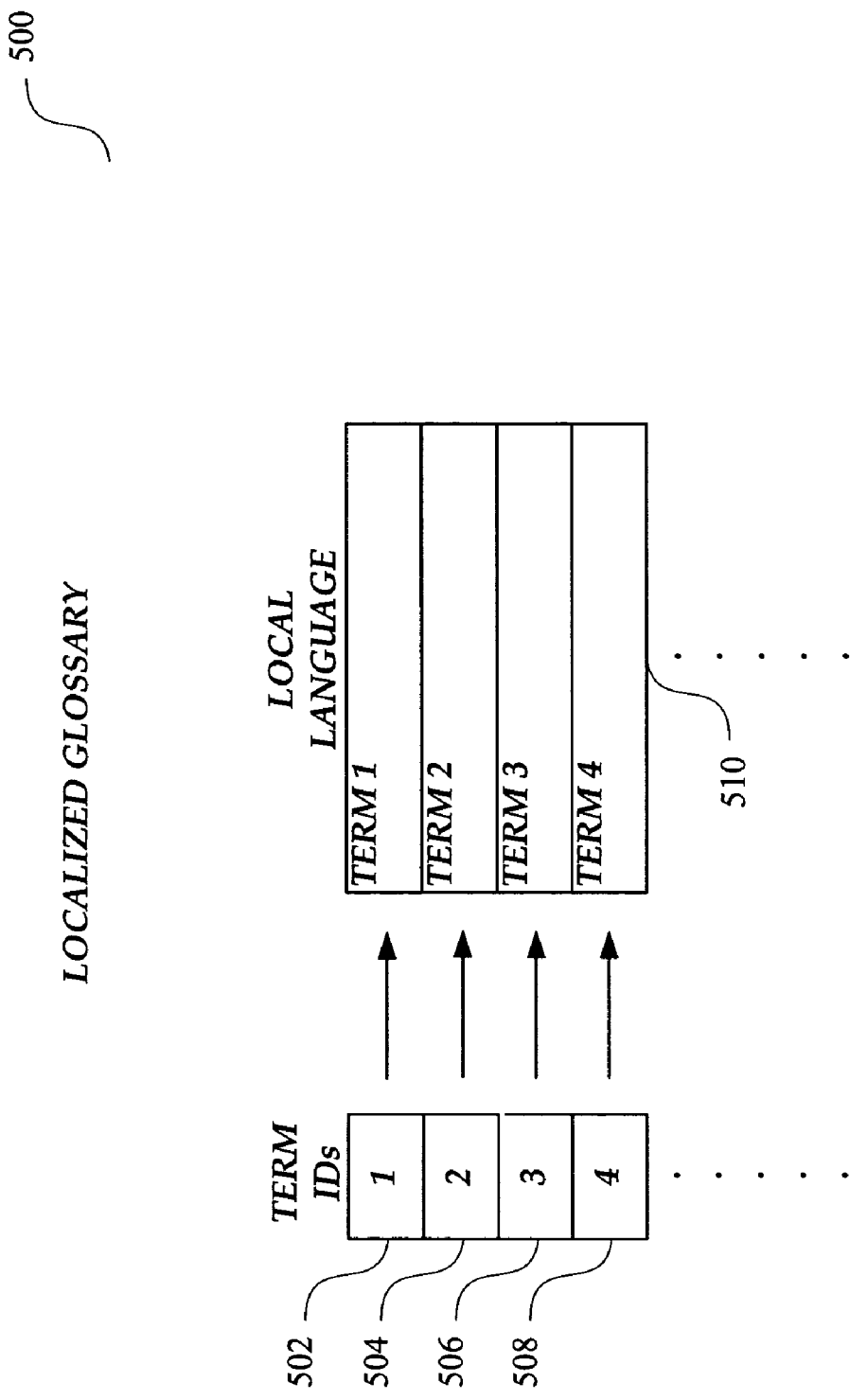
FIG. 5 is a block diagram illustrating a localized glossary.

As glossary contributions are being made, a moderator may access the active glossary 400, view the glossary contributions for source terms stored in the target language glossary 412, and lock a suggested translation for a source term, based on his or her judgment. As will be described in more detail below, once exit criteria for an active glossary 400 has been met, the active glossary 400 may be finalized or "locked." The resulting localized glossary 500 is depicted in FIG. 5. Each term in the localized glossary 500 may be the locked suggested translation of the corresponding term from the source glossary 310 as indexed by the corresponding term ID 309. However, in cases where no suggested translations were made, or no suggested translations were locked prior to the exit criteria being met, the final target language term stored in the localized glossary 114 may comprise the corresponding source language term. In other embodiments, the administrator or moderator may submit and lock his or her own suggested translation before the active glossary 400 is locked. As in the source glossary 310, the target language or "localized" term in the localized glossary 500 may be comprised of a word, phrase, number, sentence, or plurality of sentences. As opposed to the source glossary 310, the localized glossary 500 typically will not include a definition for each localized term. However, it will be appreciated that in alternative embodiments, definitions for some or all terms may also be provided in the localized glossary 500. Further, in one embodiment of the present invention, the localized glossary 500 is stored in a table in the database 112. However, in alternative embodiments, the localized glossary 500 may be stored in any data structure that facilitates distribution of the terms in the glossary. Additionally, it will be appreciated by those skilled in the art, that several localized glossaries 500 corresponding to the source glossary 310 may exist in the database 112.

Figure 6:
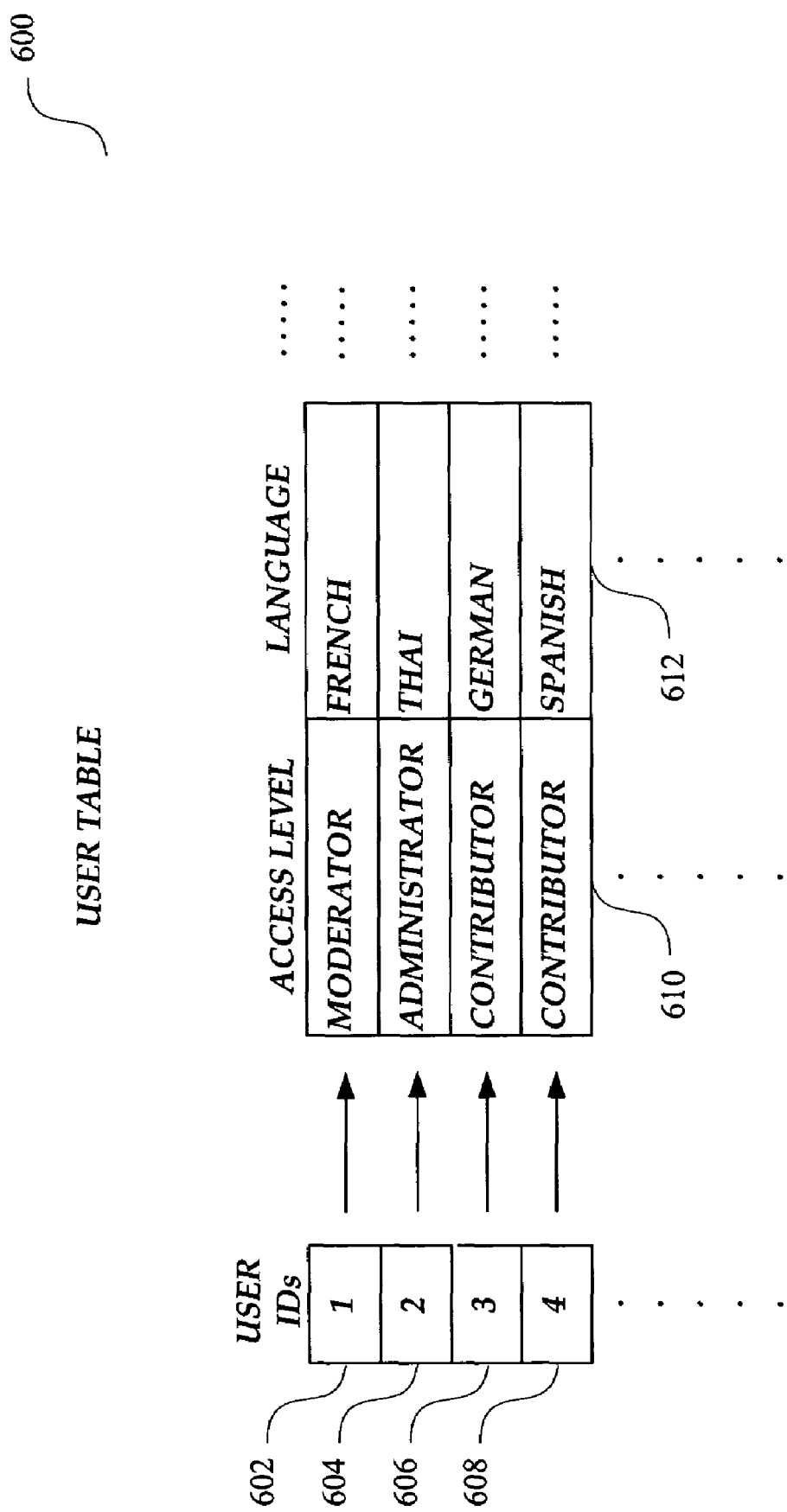
FIG. 6 is a block diagram illustrating a user table that identifies users of the Web-based translation system illustrated in FIG. 1.

In addition to storing active and localized glossaries in the database 112, data on the users' accounts (i.e., contributor, moderator, and administrator accounts) is also stored. This data may be stored in a user table 600, such as depicted in FIG. 6. In the illustrated embodiment, each row of the user table 600 contains data corresponding to a single user (i.e., contributor, moderator, or administrator). In addition, the user table 600 comprises two columns: an access-level column 610 identifying a user as a contributor, moderator or administrator; and a language column 612 identifying the target language the corresponding user is contributing, moderating, or administering. Although the illustrated user table 600 includes only two attributes for each user, i.e., access level and language, in alternative embodiments, the user table 600 may include other attributes, such as a product identification, privilege modification, etc. It will be appreciated that the number of columns or attributes in the user table 600 does not limit the scope of the claims that follow.

Now that the user table 600 has been described, the access levels that may be granted users identified in the table will be discussed in more detail. With respect to the contributor access level, each contributor is allowed to register, logon, browse a glossary, contribute to a glossary, and manage the contributor's own account. Contributors may be a native speaker of the target language or any individual deemed sufficiently knowledgeable in the source and target languages to submit suggested translations. In one embodiment of the present invention, a user registers via a Web page downloaded from the server 110 and is automatically activated as a contributor upon his or her acceptance of an end user agreement or other terms of use (although such acceptance may not be required in other embodiments). In yet other embodiments, a user may register by sending an email to a moderator or administrator, who then decides whether to grant the request to become a contributor. In addition, registration could occur manually through a written application sent via post, facsimile, etc., or other means.

For a contributor, browsing a glossary is simply looking at the contents of an active glossary 400. In one embodiment of the present invention, an active glossary 400 can be browsed via the Internet 108 using a Web browser installed on a contributor client computer 106. However, it will be appreciated that in alternative embodiments, browsing can occur through any user interface that can retrieve information from the database 112 and display the information to a user. For a contributor, contributing to an active glossary 400 stored in to the database 112 is limited to the act of submitting suggested translations (with or without accompanying comments).

Moderators of the system are allowed to logon, manage their own accounts, browse a glossary, contribute to a glossary, and monitor contributors. A moderator may be a linguistic expert in the target language, a native speaker of the target language, or any other person deemed sufficiently knowledgeable in the source and target languages to moderate the suggested translations. For a moderator, browsing a glossary comprises viewing the contents of the active glossary 400. As with a contributor, the moderator may browse the active glossary 400 via the Internet using a Web browser installed on a moderator client computer 104 or through any user interface that can access glossary data in the database 112.

In one embodiment of the present invention, the act of contributing for a moderator comprises adding suggested translations, modifying suggested translations, deleting suggested translations, and locking suggested translations. Adding, modifying, deleting, and locking a suggested translation may also be implemented using a Web page user interface or through any other user interface to the system 100. Although moderators may be allowed to modify or delete suggested translations (e.g., when duplicative, inaccurate, offensive, etc.) in some embodiments, the delete and/or modify privileges of a moderator may be limited to certain terms and/or certain active glossaries. With respect to locking, a moderator may lock a suggested translation. If a suggested translation is locked, it then becomes the final translation for that term and, thus, is stored as the target or "localized" term in the localized glossary 500, and no more suggested translations will be collected for that term. Although a moderator's act of contributing in the illustrated embodiment comprises adding, modifying, deleting, and locking, it will be appreciated that in alternative embodiments contributing for a moderator may comprise fewer or more privileges.

As noted above, a moderator may also monitor contributors. In one embodiment, a moderator's privilege of monitoring contributors comprises blocking or unblocking a contributor, and deleting a contributor. Blocking a contributor prevents the contributor from accessing the user interface to the translation system 100, e.g., a translation Web site. Unblocking a contributor allows a previously blocked contributor to access the system 100. Deleting a contributor involves deleting that contributor's account from the system, which, in the illustrated embodiment, comprises deleting a row from the user table 600 representing that contributor's account. It will be appreciated that in alternative embodiments of the present invention, the privilege of monitoring contributors may comprise fewer or more rights. Additionally, it will be appreciated by those skilled in the art that the moderating privileges may comprise fewer or more privileges than those described above. For example, moderators may be given the authority to activate contributors in response to a registration request from a potential contributor. If a moderator decides to activate a new contributor, a new row comprising data for that contributor's account will be inserted into the user table 600. Typically, the privileges of a moderator will encompass all the privileges of a contributor, plus some additional administrative privileges.

Administrators of the system are allowed to logon, manage the administrator's own account, browse a glossary, contribute to a glossary, administer moderators, and administer a translation project. Administrators are typically individuals in charge of a particular product or translation project. The privileges of browsing and contributing for an administrator generally comprise the same rights as those for a moderator plus some additional administrative privileges. Additionally, administrators are authorized to administer moderators, which includes activating and deleting moderators. In one embodiment of the present invention, activation of a moderator comprises sending an email to an administrator, who then decides whether to grant the request to become a moderator. However, in alternative embodiments of the present invention, activation of a moderator may take place through other means, e.g., via an application and interview process, a certification process, registration via a Web page, etc. In one embodiment, activating an account for a moderator comprises adding a row to the user table 600, wherein the row comprises data representing the moderator's account. Deleting a moderator's account comprises removing a row representing the moderator's account from user table 600. Administrators may also be authorized to block and/or unblock moderators' access to the translation system 100 Administering moderators may also comprise defining the privileges and rights of moderators. For example, the administrator may choose to give some moderators, but not others, the right to reject user registrations.

Administering a project, on the other hand, comprises defining exit criteria for closing a translation project. Administrators may define exit criteria for locking an active glossary 400 and forming a localized glossary 500. For example, the administrator may set a time deadline (comprising a date and/or time) for locking the active glossary 400. Accordingly, the active glossary 400 is locked when the deadline is reached. In an alternative embodiment of the present invention, the administrator may choose to lock the active glossary 400 after a certain percentage of terms have been translated, e.g., when 90% of the terms have received a suggested translation. In yet other embodiments of the present invention, the exit criteria may be a combination of date-based and completion-based deadlines. For example, the administrator may choose to lock the active glossary 400 at a particular deadline, e.g., at a particular date and/or time, but only if a predetermined percentage of terms have received suggested translations. It will be appreciated that in alternative embodiments of the present invention, administration privileges may comprise fewer or more privileges than those described above and each privilege may include fewer or more rights than illustrated. It will be appreciated by those skilled in the art, there may be fewer or more access levels than contributor, moderator, and administrator. Additionally, it will be appreciated that the privileges of a moderator and an administrator could be merged into one type of account. In one embodiment, an administrator has the most privileges, a moderator has fewer privileges than an administrator, and a contributor has the least privileges. Additionally, a moderator may perform all the functions of a contributor and an administrator may perform all the functions of a moderator.

Now that the various glossaries generated by the translation system 100 and the users who may contribute, moderate and administer those glossaries have been described, a broad overview of a typical sequence of events for translating terms from a source language to a target language will be provided. In one embodiment of the present invention, an administrator or product team selects the terms to be translated, places the terms in a source glossary 310, and stores the collecting source glossary 310 in the database 112 along with an empty target language glossary (or glossaries) 412 so as to form an active glossary 400. After the active glossary 400 is stored in the database 112, the administrator chooses a moderator for the active glossary 400 to moderate translation of the terms in the active glossary 400 in each target language. After a moderator has been chosen for each target language into which a source glossary 310 is to be translated, contributors are allowed to register. A group of contributors (and moderators and/or administrators, as the case may be) who have registered to submit translations in a particular target language may be referred to as a "community." After a contributor is registered to contribute in a particular target language, the contributor is free to begin suggesting translations for the terms in the active glossary 400. The moderator moderates the suggested translations and, in the exercise of his or her judgment, the moderator may lock a particular suggested translation, making it the final translation for a term in the source language. Upon satisfaction of some predetermined exit criteria, e.g., a time deadline or completion threshold, the active glossary 400 is locked and all of the final translations for terms in the source glossary are then stored in a localized glossary 500.

Figure 7:
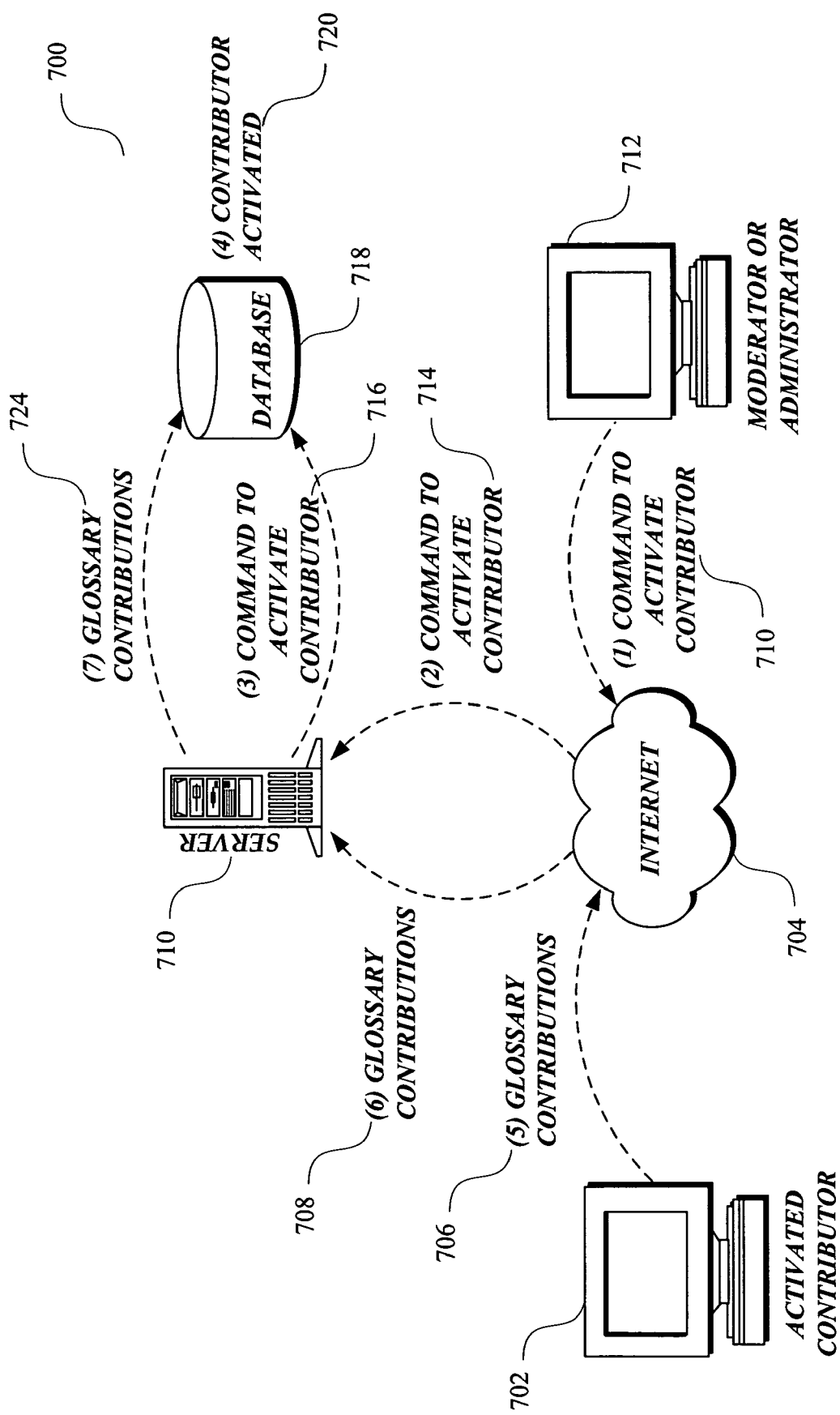
FIG. 7 is a state diagram illustrating how suggested translations for a term in a source language are contributed to an active glossary.

FIG. 7 is a state diagram illustrating how suggested translations are contributed to an active glossary 400 once a contributor has been registered. In one embodiment, users are activated and may begin submitting translations automatically upon on-line registration as noted above. In other embodiments, users are activated after a moderator decides whether the user should be granted a contributor account. In such cases, the moderator client computer 104 issues a command to activate the contributor, which is routed 702 through to the Internet 108 and forwarded 704 to the server 110 as depicted in FIG. 7. The server 110 then routes 706 the command to the database 112, where the contributor is activated 720, i.e., the contributor account information is stored in the user table 600 by adding a row.

After the contributor has registered, the contributor may submit a suggested translation to the database 112 via a Web page user interface after logging into the system 100 through a contributor client device 106. The resultant glossary contributions, i.e., suggested translation, accompanying comment, status flag, user ID, and time stamp, is routed 710 through the Internet 108 and forwarded 712 to the server 110. The server then routes 714 the contributions to the database 112, where the contributions are added 718 to the appropriate active glossary 400. More specifically, the database 112 stores the glossary contribution, i.e., the suggested translation, any comment, user ID and time stamp in the target language glossary 412 of the active glossary 400 using the term ID for the corresponding source term as an index. It will be appreciated that the invention is not limited by the manner in which data is sent from a contributor device 106 to the database 112. The invention can be practiced in any manner in which a suggested translation is obtained from a user.

Figure 8:
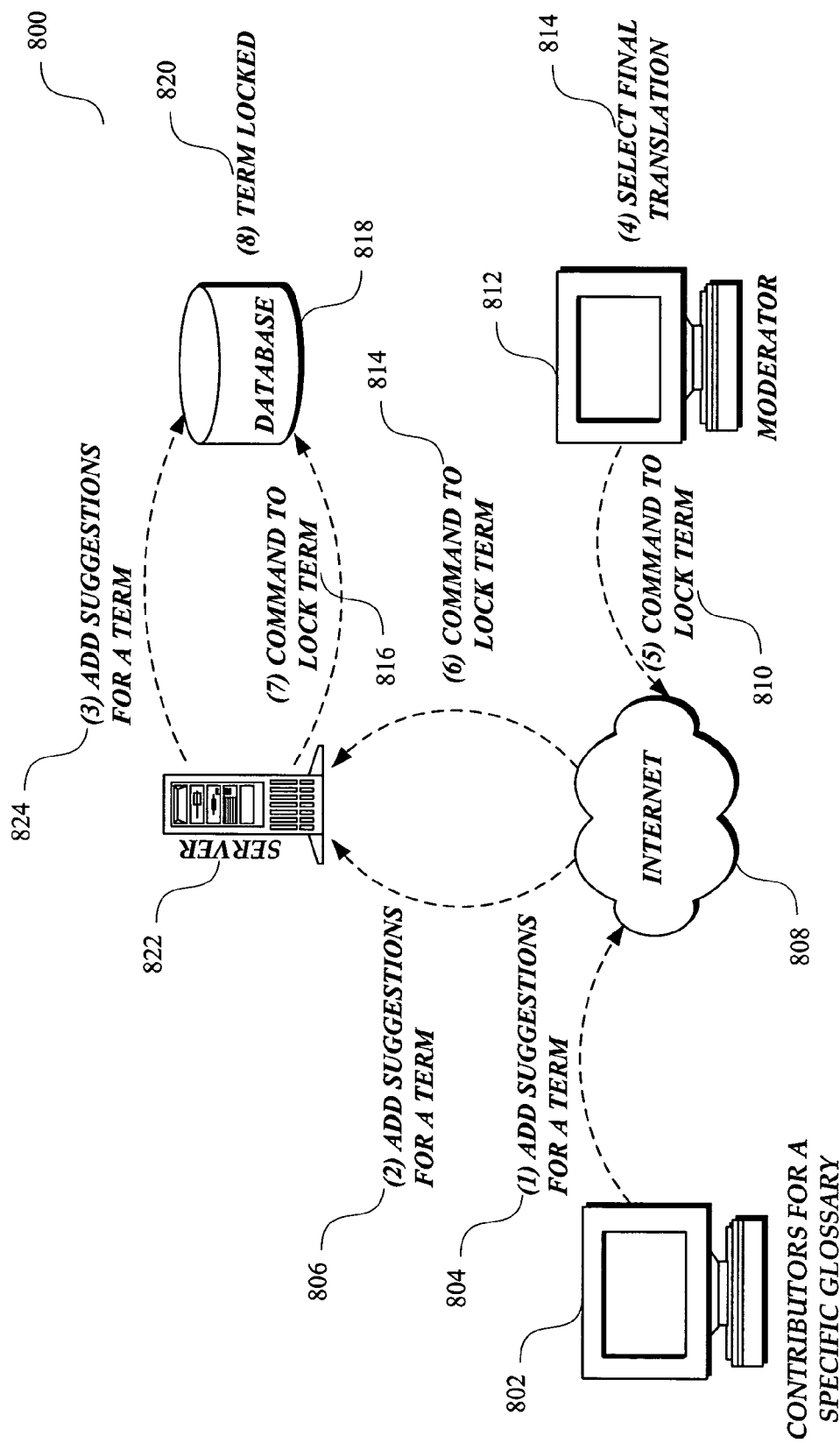
FIG. 8 is a state diagram illustrating how a suggested translation is locked as a final translation in a target language.

The process for making glossary contributions described above and depicted in FIG. 7 is repeated while a moderator monitors the active glossary 400 and locks suggested translations in a target language for particular source terms. The sequence of events for locking a term in the active glossary 400 is depicted in FIG. 8. As contributors make glossary contributions to the database 112 (e.g., events 710, 712, 714 and 716), a moderator may select 802 final translations from among the suggested translations for a term stored in the local target glossary 412 of the active glossary 400 via a Web page user interface at a moderator client computer 104. Accordingly, a command to lock the tern will be sent 810 from the moderator client computer 104 to the Internet 108, and forwarded 806 to the server 110. The server 110 then sends 808 the lock command to the database 112, where the status flag for that term is set 820 to lock in the target language glossary 412 of the active glossary 400. This sequence of events is repeated for each suggested translation locked by the moderator. It will be appreciated by those skilled in the art that the moderator may monitor the active glossary 400 and lock terms on a continuous basis, on a periodic or a periodic basis, or at a single time just before an active glossary lock by the administrator. Those skilled in the art will also recognize that a similar sequence of events occurs when a moderator adds, modifies or deletes a suggested translation.

Figure 9:
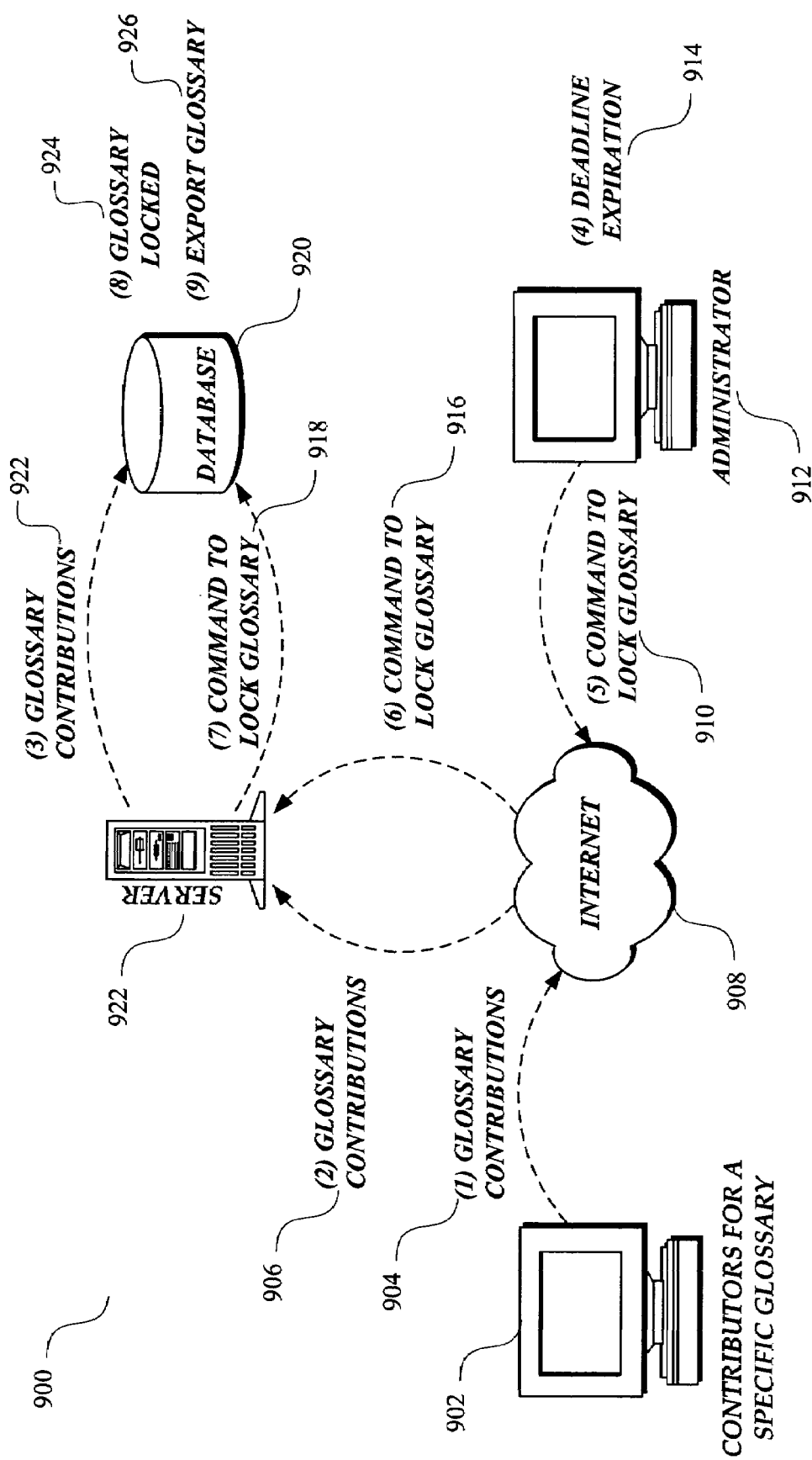
FIG. 9 is a state diagram illustrating how an active glossary is locked as a localized glossary.

As noted above, glossary contributions are collected until some predetermined exit criteria has been met and the active glossary 400 is locked. For example, in one embodiment, glossary contributions are collected until a percentage of terms in the glossary have been translated. This percentage may comprise either the percentage of locked terms or the percentage of terms that have suggested translations. In another embodiment, such as that depicted in FIG. 9, glossary contributions are collected from contributors (e.g., events 710, 712, 714 and 716) until a deadline expires 902. Once the deadline expires or a percentage of terms has been translated, an administrator may instruct the moderator to lock the active glossary 400 via an email or some other communications tool. Accordingly, the moderator browses the active glossary 400 and locks any remaining terms individually. It will be appreciated by those skilled in the art that in other embodiments, the administrator and/or moderator issues a command to lock the active glossary via a client computer upon satisfaction of the exit criteria. Such a command may automatically lock each term in the glossary, e.g., by setting the term to a default translation. Regardless, either the command itself or confirmation of the command is sent 904 from the administrator client computer 106 and routed 908 through the Internet 108 to the server 110. The server 110 then sends 908 the confirmation of/command to lock the active glossary 400 to the database 112. The active glossary 400 is then marked as locked 910 and the locked terms stored in a localized glossary 500. The localized glossary 500 may then be exported 912 to another application using a localization tool 926. However, it will be appreciated that in alternative embodiments, the localized glossary 500 need not be exported or may be exported in some other manner.

In the illustrated embodiment of the present invention, the administrator is in charge of a single active glossary 400. However, in alternative embodiments, the administrator may be in charge of several active glossaries that correspond to a single product. Additionally, an administrator may be in charge of several active glossaries that correspond to a single source language. In other embodiments, administrators may be in charge of several active glossaries that span different languages and different products. It will be appreciated by those skilled in the art, that the invention is not limited by the number of glossaries an administrator supervises.

Figure 10:
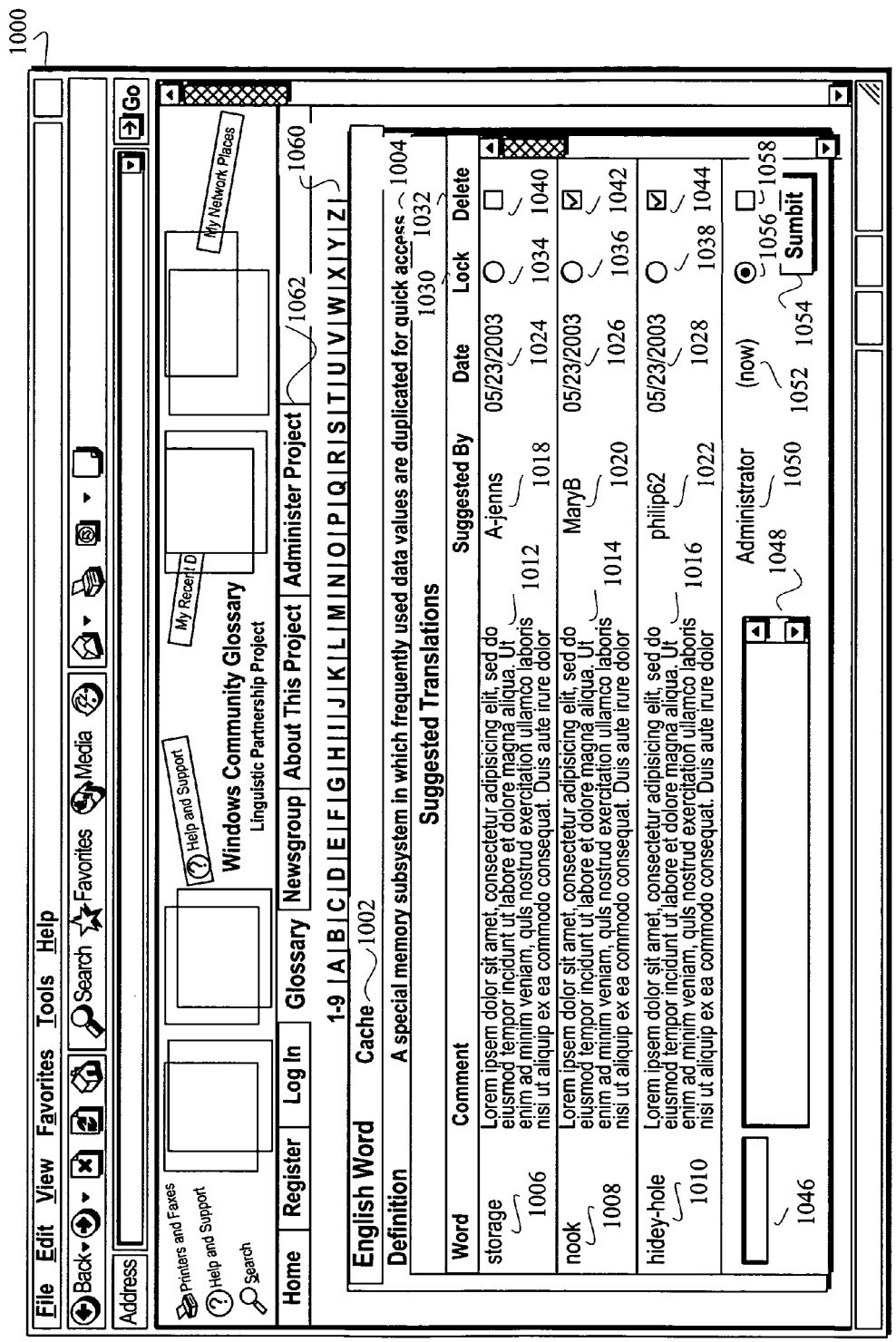
FIG. 10 illustrates an exemplary Web page generated by the server computer shown in FIG. 2 and displayed by a client computer that is used to solicit suggested translations for source terms in an active glossary.

Now that the communications between the devices in the system have been described, an exemplary user interface for enabling contributors, moderators and administrators to translate terms from a source language to a target language will be described. FIG. 10 depicts an exemplary Web page 1000 downloaded from the server 110 and displayed by the contributor client 106, through which a contributor may browse an active glossary 400 and submit suggested translations. The contributor may access Web Page 1000 by selecting a glossary tab 1002 from a previous Web page.

Web page 1000 contains a number/alphabet menu bar 1004 that a contributor may use to look up terms beginning with a particular number or letter. As a contributor browses the active glossary 400, the web page 1000 displays individual terms, e.g., "cache," from the source glossary 310 of the active glossary in a source term field 1006. In addition to the current source term, the Web page 1000 displays the definition of the current source term stored in the source glossary 310 in a definition field 1008. As shown in FIG. 10, if translations have already been suggested for the source term in the source term field 1002, a list of the previously suggested translations 1020 is also displayed. It will be appreciated from the above description that the list of suggested translations 1020 is retrieved from the glossary contributions stored in the target language glossary 412 of the active glossary 400 as indexed by the term ID 309 for the source term appearing in the source term field 1006. For example, in the illustrated embodiment, the term "storage" (in a previous word field 1012) was submitted as a suggested translation for the source term "cache," from a contributor identified as A-jenns (in user ID field 1016) on May 23, 2003 (in date field 1018). Since A-jenns also submitted a comment, his or her comment is also displayed in the Web page 1000 in a previous comment field 1014. As depicted in FIG. 10, the contributor may browse additional suggested translations by scrolling through the list of suggested translations 1020, e.g., by using a scrollbar 1024.

A contributor may submit his or her own suggested translation for the source term by entering the suggested term in a suggestion field 1009 and activating the "submit word" button 1022. In addition, the contributor may optionally submit a comment regarding his or her suggested translation in a comment field 1010. For example, the comment may explain why the contributor believes his or her suggested translation is appropriate. Once submitted, the contributor's glossary contribution, i.e., suggested translation, comment, user ID, and date of submission are added to the target language glossary 412 of the active glossary 400 as described above, and thus, added to the list of suggested translations 1020 displayed in web page 1000. The contributor may then continue to browse the active glossary 400 using the numbers and alphabet menu bar 1004.

Figure 11:
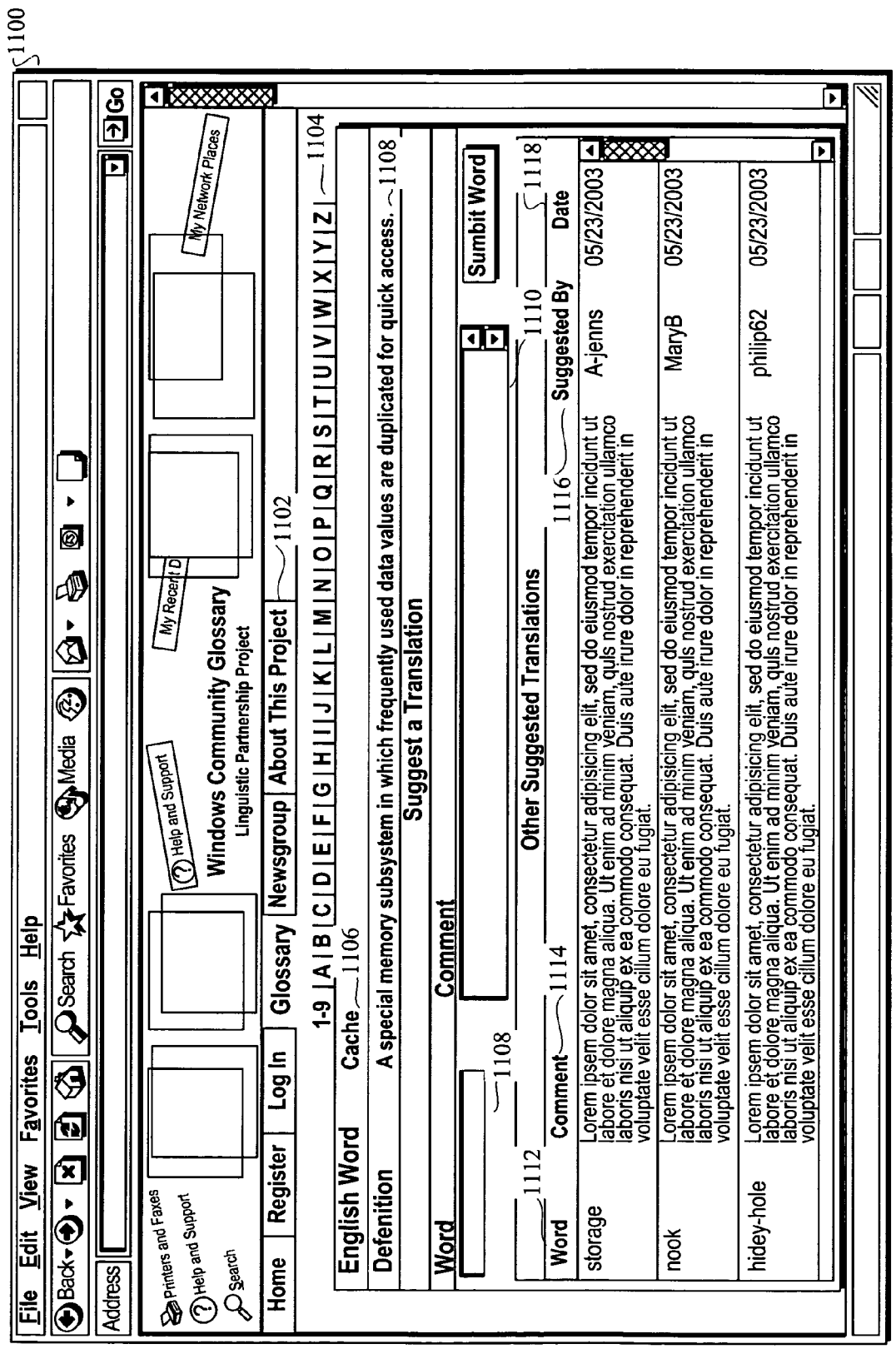
FIG. 11 illustrates an exemplary Web page generated by the server computer shown in FIG. 2 and displayed by a client computer that is used to lock suggested translations as final translations in a target language.

FIG. 11 depicts an exemplary Web page 1100 downloaded from the server 110 and displayed by the administrator client 102, through which an administrator may administer the translation project. The administrator reaches Web page 1100 by selecting a glossary tab 1102 from a previous Web page. The administrator Web page 1100 is similar to the contributor Web page 1000 depicted in FIG. 10 in that it contains a number/alphabet menu bar 1104 for browsing the active glossary 400, a source term field 1106 for displaying the current source term to be translated, a definition field 1104 reflecting the definition for the current source term being translated, and the list of previously suggested translations 1120 for the current source term being translated. As noted above, all of the foregoing information is retrieved from the active glossary 400 stored in the database 112. Like the contributor Web page 1000, the administrator Web page 1100 also includes a suggestion field 1109 for suggesting a translation for the current source term, a comment field 1110 for submitting a comment, and a submit button 1122 so that the administrator may submit his or her own suggested translation for the source term. However, as opposed to the contributor Web page 1000, the administrator Web page 1100 also includes a lock radio button 1030 and a delete check-box 1032 for each suggested translation so that the administrator can choose to lock individual suggested translations as the final localized term or delete individual suggested translations from the list of suggested translations 1120 and thus, the active glossary 400. It will be appreciated by those skilled in the art, that the server 110 may generate and download to a moderator client computer 104 a Web page similar to the administrator Web page 1100 for use by moderators so that a moderator may lock or delete suggested translations as just described. It will be appreciated that the lock radio buttons and delete check-boxes are only made available to administrators and moderators, and thus, are not displayed to contributors.

FIG. 11 depicts three translations that have already been submitted: "storage," "nook," and "hidey-hole." These are translations suggested by various contributors for the word "cache." In the illustrated embodiment, the suggested translations are in English, but the suggested translations may be submitted in the native language of the contributor. Each suggested translation was submitted with a comment. However, it will be appreciated that it is not necessary to submit a comment with a suggested translation. Each suggested translation was made by a user of the system, who may have been a contributor, moderator, or administrator. Each word was also submitted on a certain date. The server 110 or the database 112 may note the date/time at submission. However, in an alternative embodiment, the users themselves may fill in the date and/or time with each contribution. In the Web page 1100 of FIG. 11, none of the suggested translations are locked, which means users are free to submit additional suggested translations for the current source term. However, if one of the suggested translations were locked, users would be barred from submitting any more suggested translations for the word cache. A suggested translation that is locked will be the translation used in the final localized glossary. Each suggested translation also has a checkbox indicating whether it should be deleted. In the illustrative embodiment of FIG. 11, nook and hidey-hole have been selected for deletion. It will be appreciated by those skilled in the art that any or none of the suggested translations may be selected for deletion.

It will be appreciated that FIGS. 10 and 11 illustrate exemplary user interface Web pages provided by the server 110. It should be noted that the illustrated Web pages reflect just one embodiment of the present invention, and that other variations of the Web pages and other user interfaces may be employed without departing from the scope of the claims that follow. For example, an additional field or column can be added to the Web page depicted in FIG. 10 that displays a reference language that the contributor has chosen from a list of available reference languages. Accordingly, if the source language is English, the contributor may choose French as a reference language to see how the term was translated in French. As yet another example, additional Web pages can be provided upon which contributors, moderators and/or administrators can post discussions about translations an other issues.

While the preferred embodiment of the invention has been illustrated and described, it will be appreciated that various changes can be made therein without departing from the scope of the claims that follow. For example, the present invention may be used to create a thesaurus of synonyms or antonyms (in either the same source or another target language) for a collection of source terms.

The embodiments of the invention in which an exclusive property or privilege is claimed are defined as follows:

1. A computer-implemented method for translating terms from a source language to a target language, the method comprising:
   (a) providing an active glossary containing terms in the source language;
   (b) collecting one or more suggested translations in the target language for individual terms in the active glossary from at least one user, wherein collecting one or more suggested translations in the target language comprises:
      (i) publishing the active glossary for access by said at least one user; and
      (ii) accepting suggested translations for individual terms in the published active glossary from said at least one user; and
   (c) generating a localized glossary containing terms in the target language from said one or more suggested translations for each individual term collected from said at least one user.

2. The method of claim 1, wherein generating the active glossary comprises identifying terms used in a product that require translation into the target language.

3. The method of claim 1, wherein collecting suggested translations in a target language for an individual term in the active glossary continues until a final translation for the individual term is selected.

4. The method of claim 3, wherein a final translation for the individual term is selected from the collected suggested translations for the individual term.

5. The method of claim 3, wherein the final translation for the individual term is selected to be a default term.

6. The method of claim 3, wherein generating the localized glossary comprises storing the final translation for each individual term in the localized glossary.

7. The method of claim 3, wherein generating the localized glossary of terms in the target language further comprises establishing criteria for determining when to generate the localized glossary, and wherein the localized glossary is generated when the predetermined criteria has been met.

8. The method of claim 7, wherein the predetermined criteria comprises a time deadline.

9. The method of claim 7, wherein the predetermined criteria comprises a completion threshold.

10. The method of claim 7, wherein the predetermined criteria comprises a combination of a time deadline and a completion threshold.

11. The method of claim 7, wherein the predetermined criteria is established by an administrator.

12. The method of claim 3, wherein said final translations are selected by a moderator.

13. The method of claim 1, further comprising exporting the localized glossary to an application.

14. A system for translating source language terms to target language terms, the system comprising:
(a) a database storing a first glossary for source language terms, a second glossary for target language terms, and a user table for identifying each user; and
(b) a server computer communicatively coupled to said database, said server computer operable to:
(i) collect suggested translations for source language terms stored in the first glossary from a user;
(ii) obtain a final translation for individual source language terms stored in the first glossary from a user; and
(iii) store in the second glossary, selected final translations for individual source language terms.

15. The system of claim 14, further comprising a client computing device communicatively coupled to the server computer and operable to display a user interface through which the user may submit suggested translations for source language terms in the first glossary.

16. The system of claim 14, further comprising a client computing device communicatively coupled to the server computer and operable to display a user interface through which the user may select a final translation for individual source language terms in the first glossary.

17. The system of claim 14, wherein a user is authorized only to submit suggested translations for source language terms.

18. The system of claim 14, wherein a user is authorized to select final translations for individual source language terms.

19. The system of claim 14, wherein a user is authorized to determine when selected, final translations of individual source language terms are to be stored in the second glossary.

20. The system of claim 14, wherein selected, final translations of individual source language terms are stored in the second glossary when a predetermined deadline has been satisfied.

21. The system of claim 14, wherein selected, final translations of individual source language tenns are stored in the second glossary when final translations have been selected for a predetermined percentage of source language terms.

22. The system of claim 14, wherein selected, final translations of individual source language terms are stored in the second glossary when suggested translations have been collected for a predetermined percentage of source language terms.

23. The system of claim 14, wherein selected, final translations of individual source language terms are stored in the second glossary when a deadline has been satisfied and when final translations have been selected for a predetermined percentage of source language terms.

24. A computer readable medium having computer-executable components for translating terms in a source language into terms in a target language, wherein the terms in the source language are stored in an active glossary, said computer-executable components comprising:
(a) a user interface component for generating a user interface though which a user may:
(i) submit translations for individual terms in a source language;
(ii) for each individual term in the source language, lock a translation for the individual term; and
(iii) store the submitted translations for each individual term in the active glossary with additional translation data, the additional data comprising at least one of a comment, an identifier identifying the user who submitted the translation, a status flag indicating whether the submitted translation has been locked, and a time stamp; and
(b) a server component for:
(i) collecting the submitted translations and locked translations; and
(ii) for each locked translation for a term in the source language, storing the locked translation as the translated term in the target language.

25. The computer-readable medium of claim 24, wherein the user may further select a reference language for the terms in the source language through the user interface generated by the user interface component.

26. The computer-readable medium of claim 24, wherein the translated terms in the target language are stored in a localized glossary.

27. The computer-readable medium of claim 24, wherein at least one of the terms in the source language is stored the active glossary with a corresponding definition.

28. The computer-readable medium of claim 24, further comprising an export component for exporting the translated terms in the target language to an application.

29. A method for localizing a product, the method comprising:
generating a glossary of terms used in the product from a source language;
publishing the glossary of terms used in the product for access by a community of contributors;
collecting a list of suggested translations in a target language for each term in the published glossary from the community of contributors;
finalizing a localized glossary of terms in the target language for the product from the lists of suggested translations collected from the community of contributors, wherein for each term in the localized glossary, at least one term in the target language has been selected from the list of suggested translations in the target language.

30. The method of claim 29, wherein generating the localized glossary of terms in the target language further comprises establishing criteria for determining when to finalize the localized glossary.

31. The method of claim 30, wherein the predetermined criteria comprises a time deadline.

32. The method of claim 30, wherein the predetermined criteria comprises a completion threshold.

33. The method of claim 30, wherein the predetermined criteria comprises a combination of a time deadline and a completion threshold.

34. The method of claim 29, further comprising ceasing collection of the list of suggested translations for a term in the published glossary when at least one term in the target language has been selected for storage in the localized glossary from the list of suggested translations.

35. The method of claim 29, further comprising displaying a glossary of terms used in the product from a reference language.

36. A system for translating source language terms to target language terms. the system comprising:

(a) a database storing a first glossary for source language terms, a second glossary for target language terms; and
(b) a server computer communicatively coupled to said database, said server computer operable to:
  (i) collect suggested translations for source language terms stored in the first glossary from a user;
  (ii) obtain a final translation for individual source language terms stored in the first glossary from a user, the user authorized only to submit suggested translations for source language terms; and
  (iii) store in the second glossary, selected final translations for individual source language terms.

* * * * *